United States Patent
Muller et al.

(10) Patent No.: US 8,037,692 B2
(45) Date of Patent: Oct. 18, 2011

(54) THERMAL GENERATOR HAVING A MAGNETO-CALORIC MATERIAL

(75) Inventors: Christian Muller, Strasbourg (FR);
Jean-Louis Dupin, Muntzenheim (FR);
Jean-Claude Heitzler, Horbourg Wihr (FR)

(73) Assignee: Cooltech Applications S.A.S., Holtzheim (FR)

( * ) Notice: Subject to any disclaimer, the term of this patent is extended or adjusted under 35 U.S.C. 154(b) by 865 days.

(21) Appl. No.: 12/065,133

(22) PCT Filed: Aug. 16, 2006

(86) PCT No.: PCT/FR2006/001948
§ 371 (c)(1),
(2), (4) Date: Feb. 28, 2008

(87) PCT Pub. No.: WO2007/026062
PCT Pub. Date: Mar. 8, 2007

(65) Prior Publication Data
US 2008/0236172 A1   Oct. 2, 2008

(30) Foreign Application Priority Data
Sep. 1, 2005 (FR) .................................... 05 08963

(51) Int. Cl.
*F25B 21/00* (2006.01)
(52) U.S. Cl. ........................................... 62/3.1; 62/335
(58) Field of Classification Search .................. 62/3.1, 62/3.6, 335, 430, 434; 165/4
See application file for complete search history.

(56) References Cited

U.S. PATENT DOCUMENTS
5,156,003 A * 10/1992 Yoshiro et al. ................... 62/3.1
(Continued)

FOREIGN PATENT DOCUMENTS
EP   1 463 068   9/2004
(Continued)

*Primary Examiner* — Mohammad Ali
(74) *Attorney, Agent, or Firm* — Davis & Bujold, P.L.L.C.

(57) ABSTRACT

The present invention proposes a thermal generator which is non-polluting, has very good energy efficiency, is of simple and economical design and uses little energy, at the same time as being capable of further development, flexible and modular. In this thermal generator (1), the thermal elements (3) composed of magneto-calorific material each comprises two separate collector circuits (31 and 32), a "hot" collector circuit connected to a hot heat transfer fluid circuit (51) and a "cold" collector circuit (32) linked to a cold heat transfer fluid circuit (52). The heat transfer fluid is made to move alternately in one or the other of the collector circuits (31 and 32) depending on whether or not the thermal elements (3) are subjected to the magnetic field generated by the magnets (40) moving in rotation around a central axis (B) with respect to the thermal elements (3). The heat transfer fluid circuits (51 and 52) are partly incorporated in a plate (2) carrying the said thermal elements (3) and connected to external circuits which have heat exchangers (55 and 56) using the calories and frigories generated by those thermal elements (3).

20 Claims, 5 Drawing Sheets

U.S. PATENT DOCUMENTS

| | | | |
|---|---|---|---|
| 5,209,068 A * | 5/1993 | Saji et al. | 62/3.1 |
| 5,231,834 A * | 8/1993 | Burnett | 62/3.1 |
| 5,249,424 A | 10/1993 | DeGregoria et al. | |
| 5,444,983 A * | 8/1995 | Howard | 62/3.1 |
| 5,887,449 A * | 3/1999 | Pecharsky et al. | 62/3.1 |
| 6,467,274 B2 * | 10/2002 | Barclay et al. | 62/3.1 |
| 6,526,759 B2 * | 3/2003 | Zimm et al. | 62/3.1 |
| 6,935,121 B2 * | 8/2005 | Fang et al. | 62/3.1 |
| 7,168,255 B2 * | 1/2007 | Saito et al. | 62/3.1 |
| 7,281,388 B2 * | 10/2007 | Pokhama et al. | 62/259.2 |
| 7,481,064 B2 * | 1/2009 | Kitanovski et al. | 62/3.1 |
| 7,536,866 B2 * | 5/2009 | Kobayashi et al. | 62/3.1 |
| 2002/0053209 A1 * | 5/2002 | Zimm et al. | 62/3.1 |
| 2004/0093877 A1 | 5/2004 | Wada et al. | |
| 2004/0182086 A1 * | 9/2004 | Chiang et al. | 62/3.1 |
| 2005/0217278 A1 * | 10/2005 | Mongia et al. | 62/3.1 |
| 2006/0218936 A1 * | 10/2006 | Kobayashi et al. | 62/3.1 |
| 2007/0130960 A1 | 6/2007 | Muller et al. | |
| 2007/0199332 A1 | 8/2007 | Muller et al. | |
| 2007/0240428 A1 * | 10/2007 | Koga et al. | 62/3.1 |

FOREIGN PATENT DOCUMENTS

| | | |
|---|---|---|
| FR | 2 861 454 | 4/2005 |
| FR | 2 864 211 | 6/2005 |
| WO | 03/050456 | 6/2003 |

* cited by examiner

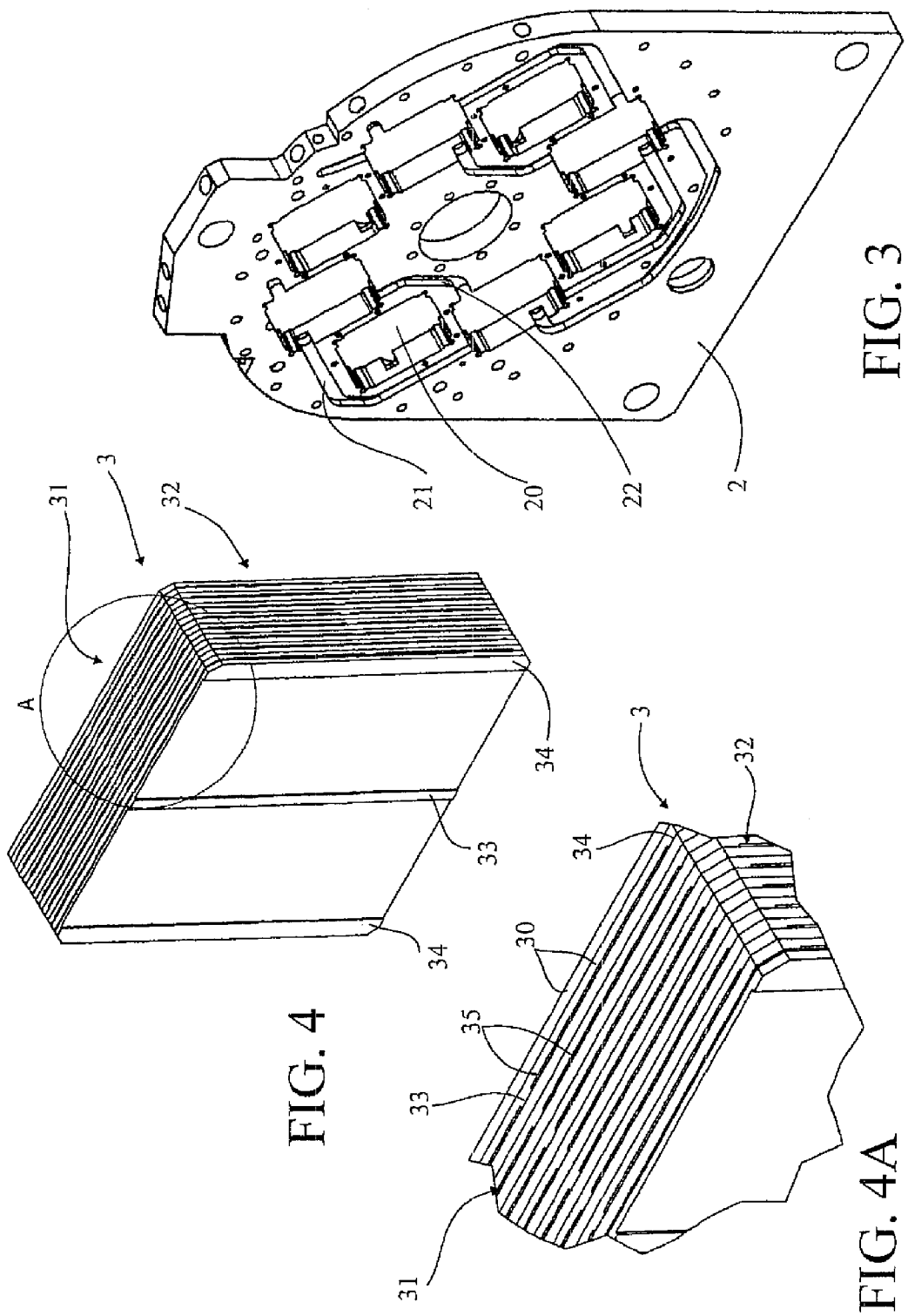

THERMAL GENERATOR HAVING A MAGNETO-CALORIC MATERIAL

TECHNICAL DOMAIN

The present invention concerns a thermal generator based on magneto-calorific material and comprising at least one fixed support carrying at least two magneto-calorific thermal elements, magnetic means which are mobile in relation to he said thermal elements so as to subject them to a variation in magnetic field in order to make their temperature vary, and means of recovering the calories and frigories emitted by the said thermal elements comprising at least two heat transfer fluid circuits, a circuit referred to as "hot" and a circuit referred to as "cold", each circuit being coupled to at least one heat exchanger and fitted with means of switching to put the corresponding thermal element into the said circuit.

EARLIER TECHNOLOGY

Thermal generators based on magneto-calorific material make use of the magneto-calorific properties of certain materials, such as gadolinium or certain alloys, which present the particularity of warming up under the effect of a magnetic field and of cooling to a temperature lower than the initial temperature following the disappearance of the magnetic field or a diminution of that magnetic field. This magneto-calorific effect occurs close to the Curie point of the material. This new generation of thermal generators presents the advantage of offering a solution which is very ecological because it does not pollute. However, in order to be economically viable and provide good thermal efficiency, the design of such generators and of their means of recovering the calories and frigories emitted by these materials is vitally important.

The publication WO-A-03/050456 gives a first example in which the thermal generator based on magneto-calorific material comprises an annular one-piece enclosure delimiting twelve compartments separated by seals and each receiving gadolinium in a porous form. Each compartment possesses four orifices, including an input orifice and an output orifice linked to a hot circuit, and an input orifice and an output orifice linked to a cold circuit. The two permanent magnets have a continuous rotational movement in such a manner that they sweep the different compartments and subject them successively to a different magnetic field. The calories and frigories emitted by the gadolinium in the different compartments are guided towards heat exchangers by hot and cold circuits in which a heat transfer fluid circulates and to which they are successively connected by means of rotating seals whose rotation is synchronised with that of the magnets. The essential requirements linked to this synchronous rotation make this device technically difficult and costly to produce. In addition, its principle of operation seriously limits its prospects for technical evolution. Furthermore, its construction is complex and costly because of the various conduits, unions and valves necessary to produce the hot and cold circuits. In addition to this the energy efficiency of such a generator remains insufficient, which considerably restricts its applications. The heat transfer fluid which circulates through the pores of the magneto-calorific material is in fact the same for the cold circuit as for the hot circuit; only its direction of flow is reversed, which results in highly penalising thermal inertia.

The publication FR-A-2 861 454 gives a second example in which the thermal elements are traversed by a channel situated close to the magneto-calorific material and communicating with the heat transfer fluid circuit through a plate on which they are mounted. This plate includes channels defining the hot and cold circuits in which the heat transfer fluid circulates and to which the channel of the thermal elements is directly connected with no intermediate conduit or union. This type of construction has the advantage of significantly reducing the cost of manufacture of such a generator and of offering a large flexibility of configuration. Nevertheless, one finds the disadvantages linked to the single heat transfer fluid, which circulates in the thermal elements for both the cold circuit and hot circuit. This solution therefore provides insufficient thermal efficiency.

DESCRIPTION OF THE INVENTION

The present invention seeks to mitigate these disadvantages by proposing a thermal generator which does not pollute, has very good energy efficiency, is of simple and economical design and consumes little energy, at the same time as being capable of further development, flexible and modular, with the ability to be used in large-scale industrial applications as well as in domestic applications.

To this end, the invention concerns a thermal generator of the type mentioned in the introduction, characterised in that each thermal element has passages for fluid 35 forming at least two distinct collector circuits, a "hot" collector circuit in which flows the heat transfer fluid of the hot circuit whose function is to collect the calories emitted by the said thermal element subjected to the magnetic field, and a "cold" collector circuit in which flows the heat transfer fluid of the cold circuit whose function is to collect the frigories emitted by the said thermal element not subjected to the magnetic field, the said heat transfer fluids being made to move alternately in one collector circuit or the other depending on whether or not the said thermal element is subjected to the magnetic field and emits calories or frigories.

The thermal elements are at least partly made from a magneto-calorific material taking at least one form chosen from the group comprising a solid block, a stack of solid blocks or solid plates, an assembly of particles, a porous block, a stack of porous blocks or of porous plates or a combination of these forms.

The collector circuits are preferably each formed from many passages for fluid, distributed through the thickness of the thermal elements in order to offer a large heat exchange area, these passages for fluid being of small size, ranging between 0.01 mm and 5 mm and preferably equal to 0.15 mm, suitable for creating a predominantly laminar flow of the heat transfer fluid through the thermal elements. The passages for fluid in the two collector circuits of each thermal element may have parallel orientations or different orientations e.g. perpendicular. They are defined by at least one form chosen from the group comprising perforations, grooves, slots, interstices, a combination of these forms, these forms being obtained by machining, chemical, ionic or mechanical etching, forming, separator between blocks or plates, space between particles.

In the preferred form of embodiment of the invention, the fixed support comprises at least one plate possessing at least two openings delimiting the cavities to receive the thermal elements and at least two series of channels forming a part of the hot and cold heat transfer fluid circuits reaching each cavity by an inlet orifice and an outlet orifice suitable for communicating with the corresponding fluid passages of the thermal elements, i.e. two inlet orifices and two outlet orifices per cavity.

The channels may be formed by grooves distributed over one face or the other or over both faces of the plate, the face(s) being covered by a plate added in such a manner as to cover and seal these channels.

The thermal elements and the cavities advantageously have complementary assembly shapes which may be approximately parallelepipedic, each side of the cavity including an inlet orifice and an outlet orifice of one of the hot and cold heat transfer fluid circuits and each side of the thermal element including an inlet and an outlet of one of its collector circuits.

In the preferred form of embodiment, a gap of between 0.05 mm and 15 mm, and preferably equal to 1 mm, is arranged in each side between the cavity and the thermal element forming a heat transfer fluid distribution chamber extending over the thickness of the thermal element, a sealing device being placed in each corner of the cavity.

This thermal generator advantageously comprises an even number of the thermal elements arranged approximately in a circle around the central axis of the support and the magnetic means are preferably coupled to means of rotational driving around this central shaft.

These magnetic means may comprise a number of magnets corresponding to the number of thermal elements, these magnets being joined in pairs and arranged on either side of the thermal elements in order to subject one element in two to the magnetic field. In a preferred form of embodiment, the thermal elements are arranged adjacently to each other so that the pairs of magnets pass from one series of thermal elements to another without interruption of the magnetic field.

The means of recovering calories and frigories may comprise means of forcing the circulation of the heat transfer fluid in one or both of the heat transfer fluid circuits. In the first case, the two hot and cold heat transfer fluid circuits are connected in a closed loop, the hot heat transfer fluid circuit connecting the outlet of a cold heat exchanger to the inlet of a hot heat exchanger and the cold heat transfer fluid circuit connecting the outlet of the hot heat exchanger to the inlet of the cold heat exchanger. In the second case, the two hot and cold heat transfer fluid circuits are independent and each forms a closed loop. The heat transfer fluids in the two hot and cold circuits preferably circulate in opposite directions.

The means of switching may comprise at least one valve in each hot and cold heat transfer fluid circuit, arranged to place in series one or the other of the collector circuits of the thermal elements depending on whether or not they are subjected to the magnetic field and produce calories or frigories.

BRIEF DESCRIPTION OF THE DRAWINGS

The present invention and its advantages will best appear in the following description of a mode of embodiment given as a non-limiting example and referring to the appended drawings, in which:

FIG. 3 is a perspective view of the plate of the generator in FIG. 1, without the thermal elements;

FIG. 4 is a perspective view of a thermal element to be mounted in the plate shown in FIG. 3 and FIG. 4A is an enlarged view of detail A in FIG. 4, and FIGS. 5A and 5B are diagrams illustrating the heat transfer fluid circuits according to the two operating cycles.

ILLUSTRATIONS OF THE INVENTION AND THE BEST WAY OF IMPLEMENTING IT

Figure 1:
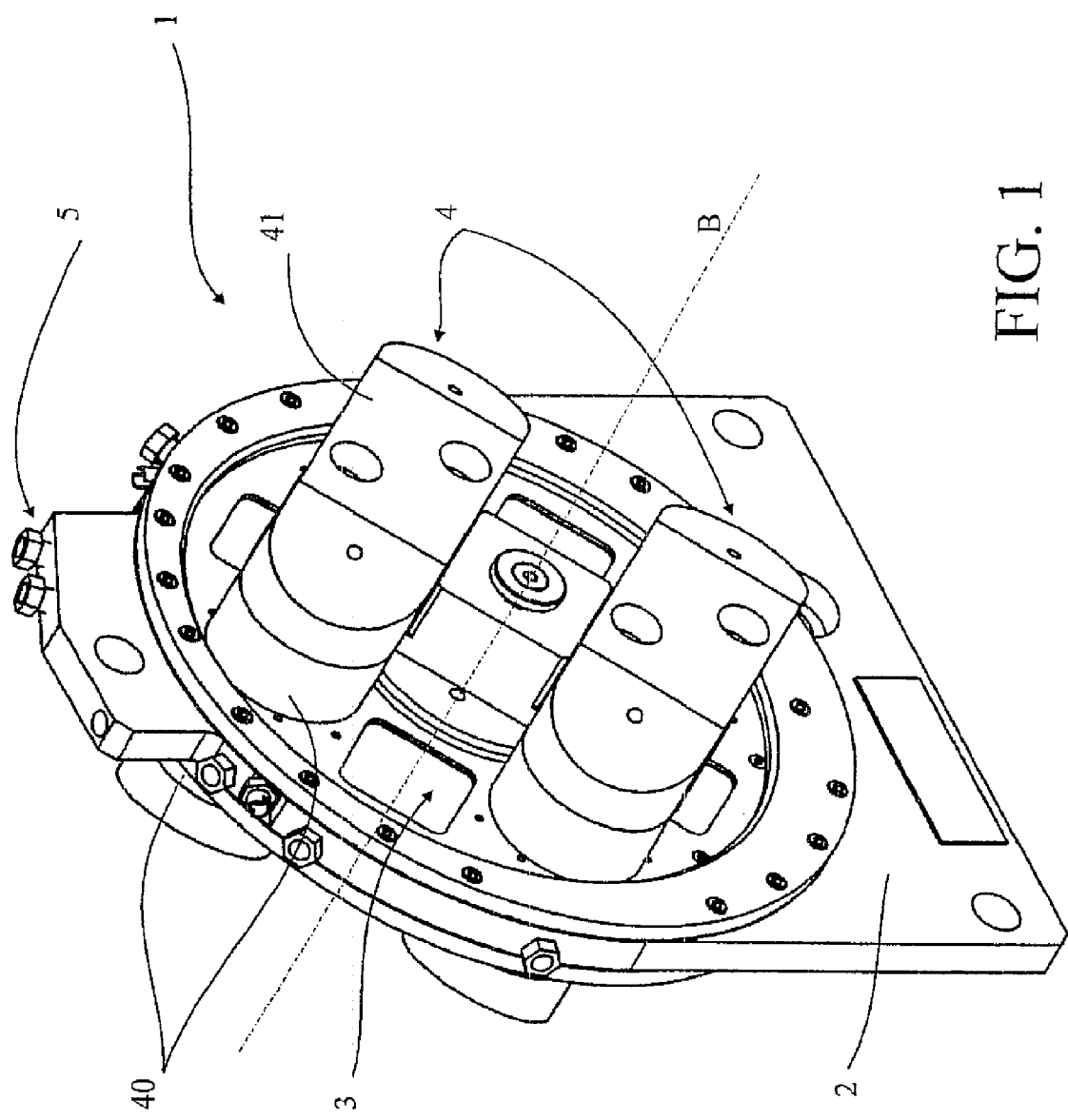
FIG. 1 is a simplified perspective view of the thermal generator according to the invention.
Figure 2:
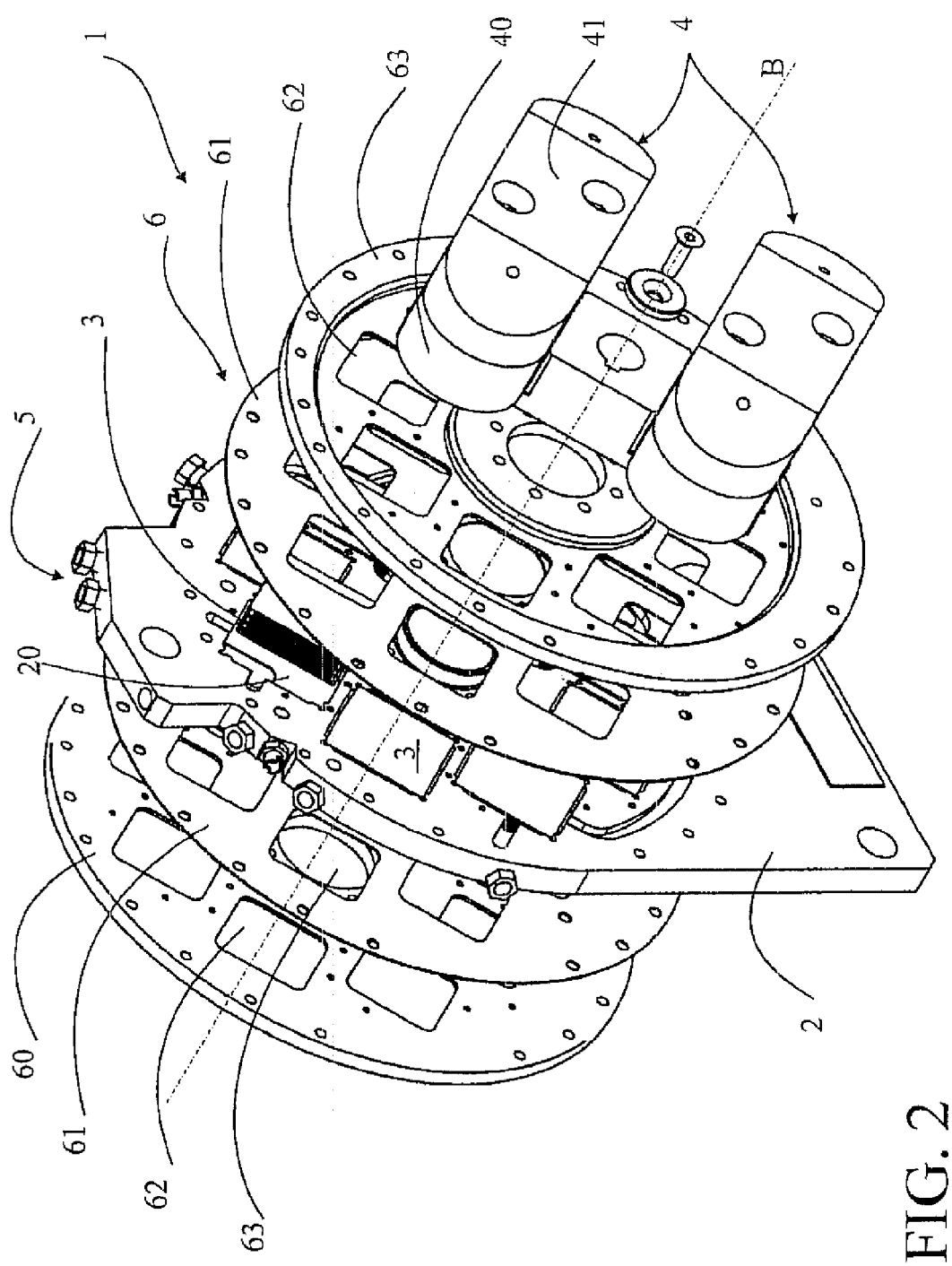
FIG. 2 is an exploded view of the generator in FIG. 1.

Referring to FIGS. 1 and 2, the thermal generator 1 according to the invention, based magneto-calorific material, comprises a fixed support taking the form of a plate 2 arranged to carry at least two, and, in the example illustrated, eight thermal elements 3 in magneto-calorific material. It also comprises magnetic means 4 which are mobile with respect to the thermal elements 3 so as to subject them to a variation in magnetic field in order to make their temperature vary, and means 5 of recovering the calories and frigories emitted by the said thermal elements 3. These means of recovery 5 include in particular two circuits 51 and 52 for heat transfer fluid which are distinct i.e. hydraulically sealed one from the other, with a "hot" circuit 51 which recovers the calories and another "cold" circuit which recovers the frigories, each of the circuits 51 and 52 being coupled to at least one heat exchanger suitable for using these calories and frigories for applications, which may be industrial or domestic, for heating, tempering, cooling, air conditioning or similar purposes.

In the example illustrated, the thermal elements 3 are housed in cavities 20 in the plate 2 and are distributed approximately in a circle around a central axis B. The magnetic means 4 comprise eight permanent magnets 40 distributed in pairs on either side of the plate 2 so as to subject one thermal element 3 in two to the magnetic field. These permanent magnets 40 are carried by two supports 41 located on either side of the plate 2 and driven in rotation by a drive shaft (not shown) coupled to any type of actuator such as a motor, geared motor, stepping motor, servomotor, rotary actuator, etc., either directly or by any suitable mechanical transmission system.

The advantage of this mode of construction of the thermal elements 3 in a circle around an axis B allows the use of a simple mode of driving the magnetic means 4 by continuous rotation in the same direction. It is clear that any other mode of construction may be suitable. If, for example, the thermal elements 3 are arranged in a line, one will choose a reciprocating mode of driving the magnetic means 4.

The permanent magnets may be solid, sintered or laminated, associated with one or more magnetisable materials, which concentrate and direct their magnetic field lines in the direction of the thermal elements 3. Any other type of magnet may be suitable, such as an electromagnetic or a superconducting magnet. A permanent magnet, however, presents definite advantages in terms of size, simplicity of use and low cost. It is preferable to choose permanent magnets 40 capable of generating a magnetic field of at least 1 Tesla.

The thermal elements 3 are, moreover, arranged adjacently to each other so that the pairs of magnets 40 pass from one series of thermal elements 3 to another without interruption of the magnetic field. This arrangement has the advantage of considerably limiting the motive force required to move the magnetic means 4 given that it does not have to oppose the magnetic force.

The plate 2 is preferably made from a thermally-insulating non-magnetic material. It has openings, which form cavities 20 with assembly shapes, which are complementary with the thermal elements 3 and of approximately equal thickness in order that the thermal elements 3 are flush with the faces of the plate 2. Other forms of construction are possible, the essential point being that each thermal element 3 can be activated by the magnetic field of the permanent magnets 40.

Referring more particularly to FIG. 3, this plate 2 has two series of channels 21 and 22 forming the inner part of the hot and cold heat transfer fluid circuits 51 and 52 respectively. The channels 21 and 22 of each series lead on the one hand to the cavities 20 by fluid inlet and outlet orifices arranged to communicate with the thermal elements 3 i.e. per cavity 20 two inlet orifices and two outlet orifices, and on the other hand to the exterior of the plate 2 by inlet and outlet orifices arranged so as to be connected to the external part of the hot and cold heat transfer fluid circuits, 51 and 52 respectively, including heat exchangers in particular. In the example represented these channels 21 and 22 are distributed over the two faces of the plate 20 and are formed by grooves, made for example by machining, etching, casting or any other suitable technique. In this embodiment the plate 2 is associated with means of sealing 6 in the form of two non-metallic flanges 60 arranged so that each bears against a face of the plate 2 through a seal 61 in the form of a membrane which enables the channels 21 and 22 to be closed and sealed. In the example represented, the flanges 60 and the seals 61 have perforations 62 and 63 arranged to correspond to the thermal elements 3 and are fixed to the plate 2, e.g. by screws or any other equivalent means. The flanges 60 and the seals 61 may also be non-perforated. The channels 21 and 22 may of course be on a single face of the plate 2. This plate 2 can also be made differently, for example as two cast parts assembled together, the channels 21 and 22 being accommodated on the inside. In the same way, the seals 61 may be replaced by a layer of suitable adhesive or something similar.

The thermal elements 3 are at least partly, and preferably entirely, made from a magneto-calorific material, such as for example gadolinium (Gd), an alloy of gadolinium containing for example silicon (Si) or germanium (Ge), an alloy of manganese containing for example iron (Fe), magnesium (Mg) or phosphorus (P) or any other equivalent magnetisable material. The choice between these magneto-calorific materials is made according to the required heating or cooling power and the necessary temperature ranges. As a general rule the magneto-calorific material may take the form of a solid block, a stack of solid blocks or solid plates, an assembly of particles in the form of powder or of particles, a porous block, a stack of porous blocks or of porous plates, or any other suitable form, or a combination of these forms. In the same way the thermal elements 3 may be comprised of an assembly of different magneto-calorific materials. They can also be made in a manner which is thermally conducting comprising one or more magneto-calorific materials.

These thermal elements 3 each have the particularity of comprising at least two collector circuits 31 and 32 which are distinct i.e. hydraulically sealed from each other, these being a "hot" collector circuit 31 connected to the hot heat transfer fluid circuit 21 and 51, and another "cold" collector circuit connected to the cold heat transfer fluid circuit 22 and 52, the heat transfer fluid in each of these circuits being made to move alternately in one or the other of the collector circuits 31 and 32 depending on whether the thermal element 3 is subjected to the magnetic field and emits calories or frigories.

In the example represented and detailed in FIGS. 4 and 4A, the thermal elements 3 are formed from a stack of solid plates 30 made from gadolinium. They have a square shape and each has three ribs, a central rib 33 and two end ribs 34, arranged such that they delimit between each other, when the plates 30 are superimposed, two narrow parallel grooves, forming passages 35 for fluid. The plates 30 are alternately oriented in perpendicular directions to form two series of fluid passages 35 forming the two distinct collector circuits 31 and 32. These collector circuits 31 and 32 are thus formed from many fluid passages 35 distributed in the thickness of the thermal elements 3 in order to offer a very large heat exchange area. These plates 30 having a thickness in the order of one millimeter, the fluid passages are of the order of a tenth of a millimeter and suitable for creating a so-called laminar flow of heat transfer fluid through the thermal elements 3 to the further benefit of the efficiency of this heat exchange with a minimal quantity of heat transfer fluid. These thermal elements 3 thus constitute active mini- or micro-heat exchangers generating and exchanging calories and frigories with the heat transfer fluids that pass through them depending on the alternations in magnetisation/demagnetisation. These fluid passages 35 may also be oriented in parallel directions.

Each collector circuit 31 and 32 leads to two opposite sides of the thermal elements 3 by a fluid inlet and outlet which communicate automatically with the inlet and outlet orifices for heat transfer fluid of the hot circuit 21 and the cold circuit 22 arranged to correspond with each other in each cavity 20 when the thermal elements 3 are mounted in the plate 2. To this end a gap of between 0.05 mm and 15 mm and preferably equal to 1 mm is arranged between the corresponding sides of the plate 2 and the thermal element 3 in order to delimit the heat transfer fluid distribution chambers extending over the thickness of the thermal element 3. Sealing of the collector circuits 31 and 32 is provided firstly between the distribution chambers by seals (not represented) arranged for example at the four corners of the cavities 20 and secondly on the front and rear faces of the plate 2 by flanges 60 and seals 61.

The collector circuits 31 and 32 can of course be made differently depending on the form of the magneto-calorific material. In the example illustrated, the plates 30 and their ribs 33 and 34 can be obtained by machining, rolling, stamping, spark erosion or similar methods. In another form of embodiment, the plates 30 can be flat and separator sheets or spacers can be placed between them in order to delimit the passages for fluid. The fluid passages 35 can thus be formed by perforations, grooves of different shapes, slots, interstices or a combination of these forms, these forms being obtained by machining, chemical, ionic or mechanical etching, forming or spacing between particles. These fluid passages 35 may have a size of between 0.01 mm and 5 mm and preferably equal to 0.15 mm, this small size contributing to the creation of a so-called laminar flow of heat exchange fluid.

Figure 5A:
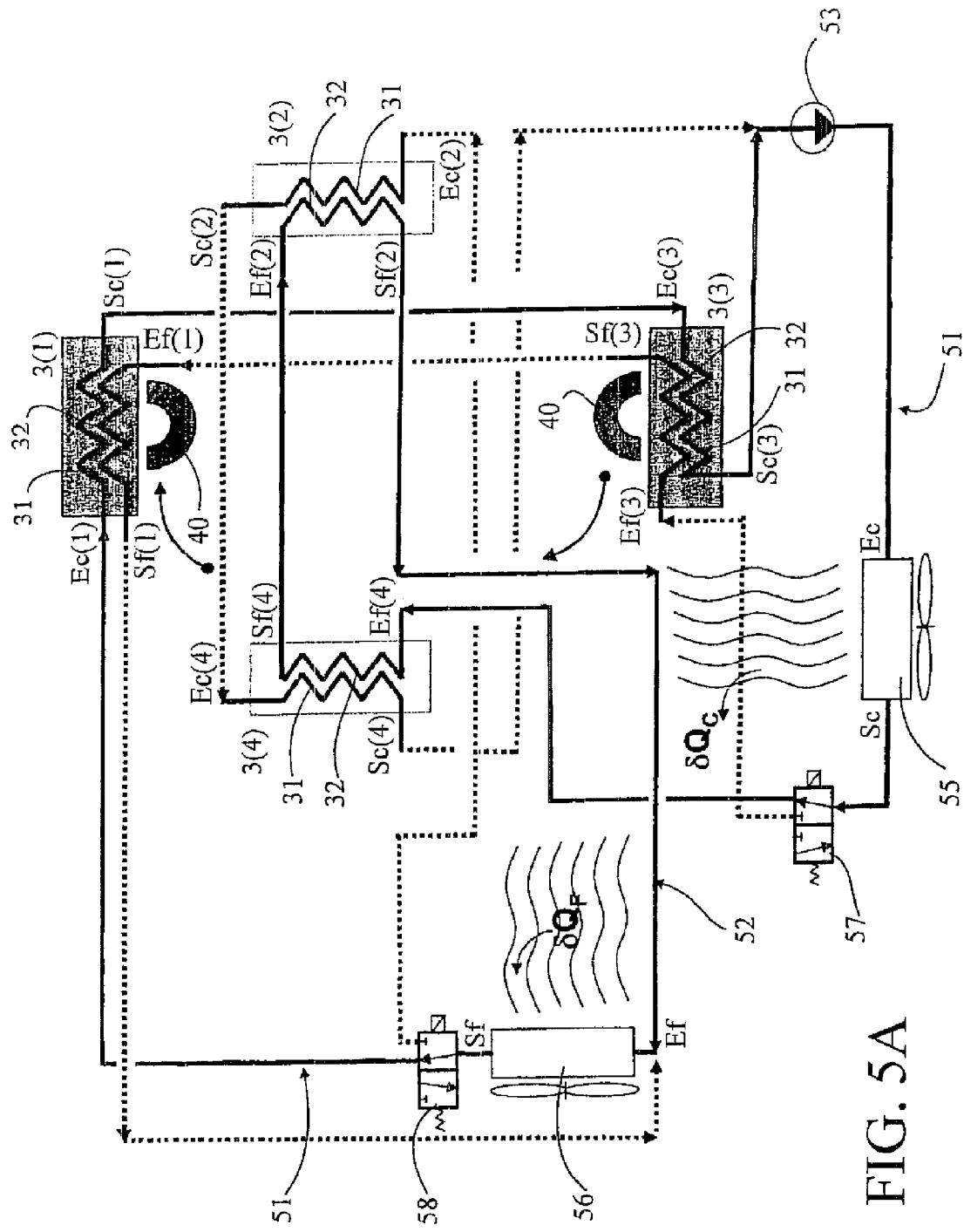
Figure 5B:
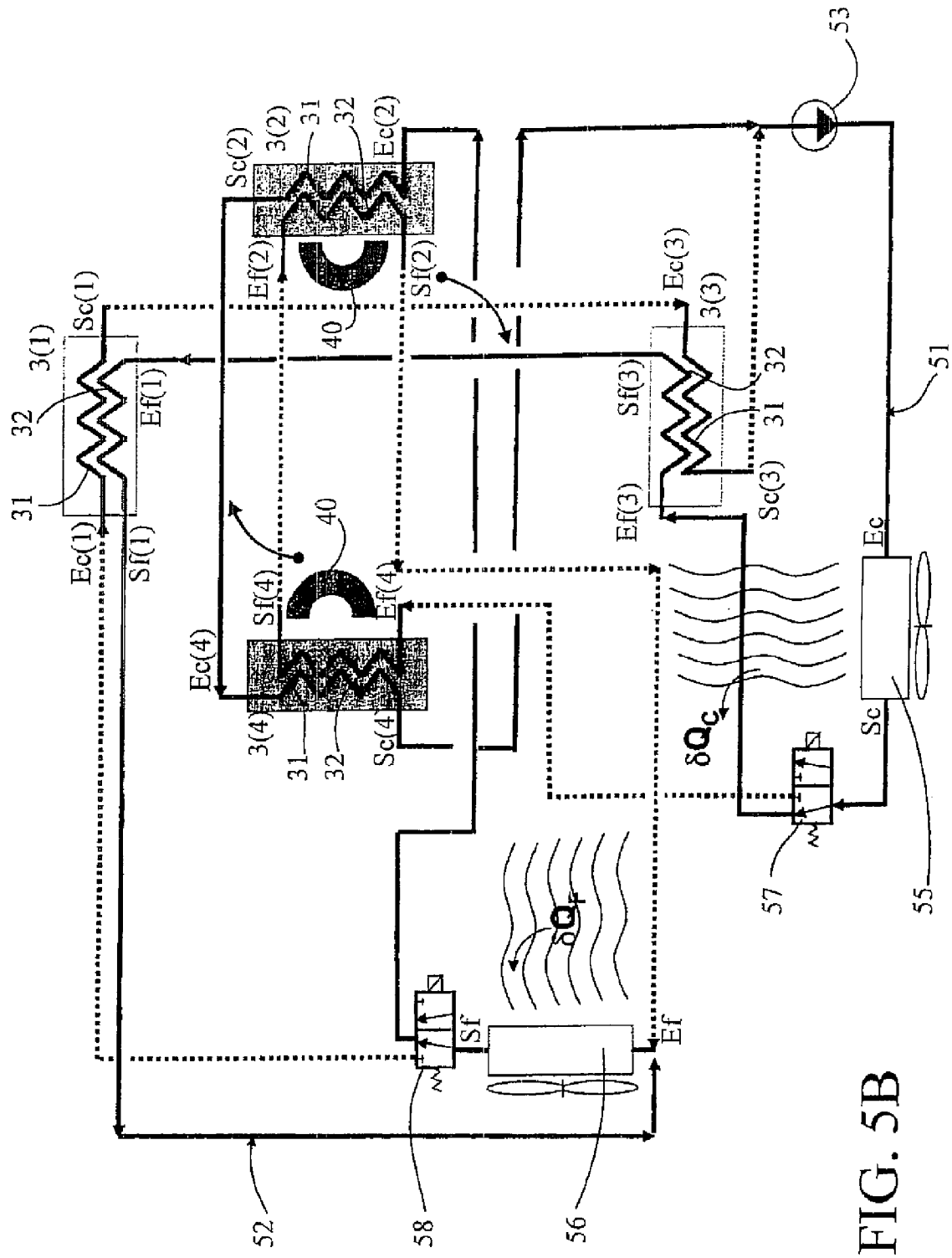

Referring now to FIGS. 5A and 5B, at least one heat exchange fluid circuit 51 or 52 includes means of forcing the circulation of heat exchange fluid, such as for example a pump 53, a thermosiphon or any other equivalent means. This circulation can also be free and natural, due simply to the temperature differences in the heat transfer fluid.

The chemical composition of the heat transfer fluid is suitable for the desired temperature range and is chosen to obtain maximal heat exchange. It is possible for example to use pure water for positive temperatures and water to which an antifreeze such as a glycolated product has been added for negative temperatures. This thermal generator 1 thus allows one to avoid the use of any fluid, which is corrosive or harmful for mankind or its environment.

Each heat transfer fluid circuit 51 or 52 has means of removing the calories and frigories collected for heating and cooling respectively, such as for example a hot heat exchanger 55 and a cold heat exchanger 56 or any other equivalent means. Similarly, each circuit 51 or 52 has means of switching to place the corresponding thermal elements 3 in the corresponding circuit 51 or 52, such as for example a two-way solenoid valve 57 and 58 or similar. The control of these solenoid valves 57 and 58 is of course synchronised with the rotation of the magnets 40 as explained below. These means of switching can also be incorporated in the plate 2, by machining and/or casting and assembly of components, the switching being obtained by magnetic attraction of a piston, a ball, etc. that moves between two parts defining the valves.

The operation of the thermal generator 1 according to the invention is described with reference to FIGS. 5A and 5B which diagrammatically illustrate the two functional cycles of the thermal generator 1 with, for the purposes of simplification, four thermal elements 3 and two pairs of magnets 40. In this example the means of recovery include a single pump 53 placed in the hot circuit 51 and the hot and cold circuits 51 and 52 are linked in a closed loop: the hot heat transfer fluid circuit 51 connecting the outlet Sf of the cold heat exchanger 56 to the inlet Ec of the hot heat exchanger 55 and the cold circuit 52 connecting the outlet Sc of the hot heat exchanger 55 to the inlet Ef of the cold heat exchanger 56. One can also provide two completely independent circuits 51 and 52, each forming a closed loop. In this case each circuit 51 and 52 has its own pump 53. In all cases the direction of flow of the heat transfer fluid in the two circuits 51 and 52 is preferably reversed. For the purposes of simplification, the hot and cold circuits are identified as 51 and 52, knowing that a part of these hot and cold circuits is internal to the thermal generator 1 and incorporated in the plate 2 under the identifications 21 and 22.

In the first functional cycle illustrated by FIG. 5A, the magnets 40 are opposite the two thermal elements 3(1) and 3(3) which heat up under the effect of the magnetic field, the other two thermal elements 3(2) and 3(4) cooling down because they are not subjected to the magnetic field. The solenoid valves 57 and 58 are switched in a first position which allows the placing in series in the hot circuit 51 of the thermal elements 3(1) and 3(3) which heat up and in series in the cold circuit 52 of the thermal elements 3(2) and 3(4) which cool down, the circuits in which the heat transfer fluid is in movement being shown as a solid line. The outlet Sf of the cold heat exchanger 56 is connected, by the solenoid valve 58, to the inlet Ec(1) of the thermal element 3(1), its outlet Sc(1) is connected to the inlet Ec(3) of the thermal element 3(3) and its outlet Sc(3) to the inlet Ec of the hot heat exchanger 51. The hot circuit 51 makes the heat transfer fluid move in the hot collector circuits 31 of the thermal elements 3(1) and 3(3), the others being inactive. In the same way, the outlet Sc of the hot heat exchanger 55 is connected, by the solenoid valve 57, to the inlet Ef(4) of the thermal element 3(4), its outlet Sf(4) is connected to the inlet Ef(2) of the thermal element 3(2) and its outlet Sf(2) to the inlet Ef of the cold heat exchanger 56. The cold circuit 52 makes the heat transfer fluid move in the cold collector circuits 32 of the thermal elements 3(2) and 3(4), the others being inactive. This cycle is rapid and lasts between a few thousandths of a second and 20 seconds and preferably 1 second, corresponding to the time of passage of the magnets in front of the thermal elements 3(1) and 3(3).

When they leave them to pass in front of the thermal elements 3(2) and 3(4), the solenoid valves 57 and 58 are switched into a second position illustrated in FIG. 5B corresponding to the second functional cycle in which the magnets 40 are opposite the two other thermal elements 3(2) and 3(4) which heat up under the effect of the magnetic field, the first two thermal elements 3(1) and 3(3) cooling because they are no longer subjected to the magnetic field. The solenoid valves 57 and 58 switched to their second position place in the hot circuit 51 the thermal elements 3(2) and 3(4) which heat up and in the cold circuit 52 the thermal elements 3(1) and 3(3) which cool, the circuits in which the heat transfer fluid is in movement being shown as a solid line. The outlet Sf of the cold heat exchanger 56 is connected, by the solenoid valve 58, to the inlet Ec(2) of the thermal element 3(2), its outlet Sc(2) is connected to the inlet Ec(4) of the thermal element 3(4) and its outlet Sc(4) to the inlet Ec of the hot heat exchanger 55. The hot circuit 51 makes the heat transfer fluid move in the hot collector circuits 31 of the thermal elements 3(2) and 3(4), the others being inactive. In the same way, the outlet Sc of the hot heat exchanger 55 is connected, by the solenoid valve 57, to the inlet Ef(3) of the thermal element 3(3), its outlet Sf(3) is connected to the inlet Ef(1) of the thermal element 3(1) and its outlet Sf(1) to the inlet Ef of the cold heat exchanger 56. The cold circuit 52 makes the heat transfer fluid move in the cold collector circuits 32 of the thermal elements 3(1) and 3(3), the others being inactive. This rapid cycle corresponds to the time of passage of the magnets 40 in front of the thermal elements 3(2) and 3(4). When they leave them to again come in front of the thermal elements 3(1) and 3(3), the solenoid valves 57 and 58 are switched to their first position illustrated in FIG. 5A and the first functional cycle starts again.

The fact that the heat transfer fluid used is a liquid and not a gas avoids the need for a non-return valve. The example can be seen in FIGS. 5A and 5B in which, at the inlets Ec and Ef of the hot and cold heat exchangers 55 and 56, the double hot circuits 51 and 52 respectively meet each other. The heat transfer fluid, being a liquid, is not compressible and naturally goes into the circuit, which is closed and not the circuit, which is open.

This description clearly shows that the hot and cold circuits 51 and 52 are active and dynamic in both functional cycles, in the same way as the thermal elements 3 are all used. Furthermore, the heat transfer fluid, which recovers the calories is limited to that function, as is the heat transfer fluid which recovers the frigories. Given that there is no mixing of heat transfer fluid at different temperatures, as in the earlier technology, the hot and cold circuits 51 and 52 being separate, in particular in the case of the collector circuits 31 and 32 in the thermal elements 3, there is no heat exchange or mixing between circuits. This new technology also allows a considerable reduction in thermal losses, an acceleration of the functional cycles, an increase in the power of the thermal generator 1 and the achievement of very good thermal efficiencies for a much reduced energy requirement in view of the low motive power necessary to make the magnets 40 rotate.

Furthermore, this technique of separate hot circuits 21, 31 and 51 and cold circuits 22, 32 and 52 allows the "AMR" cycle to be used i.e. for each new functional cycle of the thermal generator 1 the temperature difference between the temperatures at the beginning and the end of the cycle increases, respectively allowing heating and cooling temperature levels to be reached in the hot circuit 51 and the cold circuit 52 which are greater than in generators of this type known at present. In addition, the thermal generator 1 of the invention presents no danger either for people or for the environment. If in fact there were a lack of heat transfer fluid in the hot circuit 51 and the cold circuit 52, there would be no further heat exchange and therefore no risk of thermal runaway.

POSSIBLE INDUSTRIAL APPLICATIONS

This thermal generator 1 finds its application in any technical domain where it is necessary to heat, temper, cool or air-condition, as in domestic electrical apparatus for refrigerators and freezers, for air conditioning and heating, whether industrial, domestic or vehicular, in the food industry for display cases and refrigerated cabinets, in air conditioned wine cellars and in all types of refrigerated enclosure.

The present invention is not restricted to the example of embodiment described, but extends to any modification or variant which is obvious to a specialist in the field while remaining within the scope of the protection defined in the attached Claims. In particular, the shapes illustrated, the number of thermal elements 3 and of magnets 40, the way of creating the collector circuits 31 and 32 and of incorporating the hot circuits 21 and cold circuits 22 in the plate 2 may differ.

The invention claimed is:

1. A thermal generator (1) based on magneto-calorific material comprising: at least one fixed support (2) carrying at least two magneto-calorific thermal elements (3), magnetic means (4) being mobile in relation to the at least two thermal elements (3) so as to subject the at least two thermal elements (3) to a variation in magnetic field in order to make the temperature of the at least two thermal elements vary, and means for recovering the calories and frigories emitted by the at least two thermal elements (3) comprising at least two separate and distinct circuits (51 and 52), a first hot circuit (51) referred to as "hot" and a second cold circuit (52) referred to as "cold", each circuit (51 and 52) being coupled to at least one heat exchanger (55 and 56) able to remove the calories or frigories recovered and fitted with means for switching (57 and 58) to put the corresponding thermal element (3) into the circuit (51 and 52), wherein each of the at least two thermal elements (3) has passages for fluid (35) forming at least two distinct collector circuits (31 and 32), a "hot" collector circuit (31) in which flows a heat transfer fluid of the hot circuit (51) whose function is to collect the calories emitted by the thermal element (3) subjected to the magnetic field, and a "cold" collector circuit (32) in which flows a heat transfer fluid of the cold circuit (52) whose function is to collect the frigories emitted by the thermal element (3) not subjected to the magnetic field, the heat transfer fluids moving alternately in one collector circuit to the other (31 and 32) depending on whether or not the thermal element (3) is subjected to the magnetic field and emits calories or frigories.

2. The thermal generator according to claim 1, wherein the thermal elements (3) are at least partly made from a magneto-calorific material taking at least one form chosen from a group comprising a solid block, a stack of solid blocks or solid plates (30), an assembly of particles, a porous block, a stack of porous blocks or of porous plates and a combination thereof.

3. The thermal generator according to claim 2, wherein the collector circuits (31 and 32) are preferably each formed from many passages for fluid (35), distributed in a thickness of the thermal elements (3) in order to offer a large heat exchange area.

4. The thermal generator according to claim 3, wherein the passages for fluid (35) are of small size ranging between 0.01 mm and 5 mm and suitable for creating a flow of the heat transfer fluid through the thermal elements (3), and the flow being predominantly laminar.

5. The thermal generator according to claim 3, wherein the passages for fluid (35) in the two collector circuits (31 and 32) of each thermal element (3) have different orientations.

6. The thermal generator according to claim 3, wherein the passages for fluid (35) in the two collector circuits (31 and 32) of each thermal element (3) have approximately parallel orientations.

7. The thermal generator according to claim 3, wherein the passages for fluid (35) are defined at least by one form chosen from the group comprising perforations, grooves, slots, interstices, and a combination thereof obtained by machining, chemical, ionic or mechanical etching, forming, separator between blocks or plates, space between particles.

8. The thermal generator according to claim 1, wherein the fixed support comprises at least one plate (2) possessing at least two openings delimiting cavities (20) to receive the thermal elements (3) and at least two series of channels (21 and 22) forming a part of the hot and cold heat transfer fluid circuits (51 and 52) reaching each cavity (20) by an inlet orifice and an outlet orifice for each circuit (51 and 52) suitable for communicating with the corresponding fluid passages (35) of the thermal elements (3).

9. The thermal generator according to claim 8, wherein the channels (21 and 22) are formed by grooves distributed over one of the faces of the plate (2) and the thermal generator (1) comprises at least one flange (60) added to the face of the plate (2) so as to cover and seal the channels (21 and 22).

10. The thermal generator according to claim 4, wherein the thermal elements (3) and the cavities (20) have complementary assembly shapes.

11. The thermal generator according to claim 10, wherein the complementary assembly shapes are approximately parallelepipedic, each side of the cavity (20) includes an inlet orifice or an outlet orifice of one of the hot and the cold heat transfer fluid circuits (51 and 52) and each side of the thermal element (3) includes an inlet and an outlet of one of its collector circuits (31 and 32).

12. The thermal generator according to claim 11, wherein a gap of between 0.05 mm and 15 mm is arranged in each side between the cavity (20) and the thermal element (3), this gap forming a heat transfer fluid distribution chamber extending over the thickness of the thermal element (3) and a sealing device is placed in each corner of the cavity (20).

13. The thermal generator according to claim 1, wherein the generator has an even number of thermal elements (3) arranged approximately in a circle around a central axis (B) of the support (2) and the magnetic means (4) are coupled to means for rotational driving around this central axis (B).

14. The thermal generator according to claim 13, wherein the magnetic means (4) comprise a number of magnets (40) corresponding to the number of thermal elements (3), the magnets (40) are joined in pairs and arranged on either side of the thermal elements (3) in order to subject one thermal element (3) in two to the magnetic field.

15. The thermal generator according to claim 14, wherein the thermal elements (3) are arranged adjacently to each other so that the pairs of magnets (40) pass from one series of thermal elements (3) to another without interruption of the magnetic field.

16. The thermal generator according to claim 1, wherein the heat transfer fluids in the hot and the cold circuits (51 and 52) flow in opposite directions.

17. The thermal generator according to claim 1, wherein the means for recovering the calories and frigories include means (53) for forcing the heat transfer fluid to flow in at least one of the heat transfer fluid circuits (51 and 52).

18. The thermal generator according to claim 17, wherein the hot and the cold heat transfer fluid circuits (51 and 52) are connected in a closed loop, the hot heat transfer fluid circuit (51) connects the outlet (Sf) of a cold heat exchanger (56) to the inlet (Ec) of a hot heat exchanger (55) and the cold heat transfer fluid circuit (52) connects the outlet (Sc) of the hot heat exchanger (55) to the inlet (Ef) of the cold heat exchanger (56).

19. The thermal generator according to claim 1, wherein the means for recovering calories and frigories comprise means (53) for forcing the circulation of the heat transfer fluid in one or both of the heat transfer fluid circuits (51 and 52), the circuits are independent and each form a closed loop.

20. The thermal generator according to claim 1, wherein the means for switching comprise at least one valve (57 and 58) in each hot and the cold heat transfer fluid circuit (51 and 52), arranged to place in series one or the other of the collector circuits (31 and 32) of the thermal elements (3) depending on whether or not they are subjected to the magnetic field and produce calories or frigories.

* * * * *